(12) United States Patent
Sabraoui et al.

(10) Patent No.: US 11,835,373 B2
(45) Date of Patent: Dec. 5, 2023

(54) MEASUREMENT OF FLOW RATE FROM THE ELECTRICAL IMPEDANCES OF PIEZOELECTRIC TRANSDUCERS

(71) Applicant: SAGEMCOM ENERGY & TELECOM SAS, Rueil Malmaison (FR)

(72) Inventors: Abbas Sabraoui, Rueil Malmaison (FR); Ahmet Samed Basturk, Rueil Malmaison (FR); Oussama Abid, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 18/140,868

(22) Filed: Apr. 28, 2023

(65) Prior Publication Data
US 2023/0349741 A1 Nov. 2, 2023

(30) Foreign Application Priority Data

Apr. 29, 2022 (FR) .................................. FR2204103

(51) Int. Cl.
*G01F 1/66* (2022.01)
*G01F 1/667* (2022.01)
*G01F 15/00* (2006.01)
(52) U.S. Cl.
CPC .............. *G01F 1/667* (2013.01); *G01F 1/662* (2013.01); *G01F 15/005* (2013.01)

(58) Field of Classification Search
None
See application file for complete search history.

(56) References Cited

U.S. PATENT DOCUMENTS

| 7,526,966 B2 * | 5/2009 | Gysling | .................. | G01F 1/667 |
| | | | | 73/861.23 |
| 2017/0090485 A1 | 3/2017 | Ohashi et al. | | |
| 2022/0049478 A1 | 2/2022 | Mason | | |

FOREIGN PATENT DOCUMENTS

DE        102019105948 A1    9/2020

* cited by examiner

*Primary Examiner* — Harshad R Patel
(74) *Attorney, Agent, or Firm* — Muncy, Geissler, Olds & Lowe, P.C.

(57) ABSTRACT

An ultrasonic fluid meter comprising a conduit in which a fluid can flow, an ultrasonic measuring device comprising an upstream transducer and a downstream transducer for evaluating a current flow rate, a valve comprising a movable member for controlling the current flow rate, a position sensor for measuring a current position of the movable member, a processing circuit for, if the current position of the movable member is such that the current flow rate cannot be measured by the ultrasonic measuring device, evaluating the current flow rate as a function of the current position of the movable member and of a pressure value which is representative of a difference between a second pressure of the fluid downstream of the valve, evaluated via an impedance of the downstream transducer, and a first pressure of the fluid upstream of the valve, evaluated via an impedance of the upstream transducer.

17 Claims, 17 Drawing Sheets

| | $D_1$ [L/h] | $D_2$ [L/h] | $D_3$ [L/h] | $D_4$ [L/h] |
|---|---|---|---|---|
| $T_1$ [°C] | $\Delta TOF_{11}$ | ... | ... | ... |
| $T_2$ [°C] | $\Delta TOF_{21}$ | $\Delta TOF_{22}$ | ... | ... |
| $T_3$ [°C] | $\Delta TOF_{31}$ | $\Delta TOF_{32}$ | $\Delta TOF_{33}$ | ... |

| | $D_1$ [L/h] | $D_2$ [L/h] | $D_3$ [L/h] | $D_4$ [L/h] |
|---|---|---|---|---|
| $\vartheta_1$ [rad] | $\Delta P_{11}$ | ... | ... | ... |
| $\vartheta_2$ [rad] | $\Delta P_{21}$ | $\Delta P_{22}$ | ... | ... |
| $\vartheta_3$ [rad] | $\Delta P_{31}$ | $\Delta P_{32}$ | $\Delta P_{33}$ | ... |

Fig. 7

MEASUREMENT OF FLOW RATE FROM THE ELECTRICAL IMPEDANCES OF PIEZOELECTRIC TRANSDUCERS

The invention relates to the field of ultrasonic fluid meters.

BACKGROUND OF THE INVENTION

An ultrasonic fluid meter will most usually comprise a conduit in which the fluid flows, and an ultrasonic measuring device comprising an upstream transducer (on the network side) and a downstream transducer (on the subscriber's installation side). Each transducer acts in succession as an emitter and as a receiver of ultrasonic signals. The upstream transducer therefore emits an ultrasonic signal into the conduit, which is received by the downstream transducer after having travelled in the fluid along a predefined path (of precisely known length). Next, the downstream transducer in turn emits an ultrasonic signal which is received by the upstream transducer after having travelled in the fluid along the predefined path (in the other direction). The ultrasonic measuring device then evaluates the flow rate of the fluid on the basis of the times of flight of the ultrasonic signals between the transducers. Estimating the fluid flow rate makes it possible to evaluate and invoice the quantity of fluid consumed.

In some countries, meters must be capable of limiting, regulating and shutting off the flow rate of fluid. As an example, in some countries and in the case of an unpaid water bill, the water distributor must provide the "bad payer" end-customer with a minimum flow rate for a certain number of days before completely shutting off access to the water.

This minimum flow rate may vary as a function of the country and the customer, and it is therefore necessary to have the possibility of regulating the flow rate "on demand": the flow rate has to be adjusted as a function of a flow rate setpoint.

In order to regulate the flow rate, proposals have been made to integrate a motorized ball valve into the meter conduit. The angular position of the ball can be controlled remotely in order to regulate the flow rate.

However, the dimensions of the meter must be limited, and it may be necessary to position the valve in the flow rate measurement zone, i.e. between the two transducers.

However, when the valve is not open sufficiently, the ultrasonic signals cannot travel in the conduit in the normal manner and follow the predefined path.

It is therefore impossible to measure and regulate the flow rate for certain angular positions of the ball.

OBJECT OF THE INVENTION

The aim of the invention is to be able to measure and regulate the flow rate of fluid irrespective of the state of the valve (open, closed, partially open) in an ultrasonic fluid meter comprising a conduit in which the fluid flows and a valve positioned in the conduit.

SUMMARY OF THE INVENTION

In order to achieve this aim, an ultrasonic fluid meter is provided comprising:
a conduit in which a fluid can flow;
an ultrasonic measuring device comprising an upstream transducer and a downstream transducer which are piezoelectric transducers and which are configured to emit and receive ultrasonic signals in the conduit, the ultrasonic measuring device being configured to evaluate a current flow rate of the fluid from the time of flight of the ultrasonic signals between the upstream transducer and the downstream transducer;
a valve positioned along a length of the conduit between the upstream piezoelectric transducer and the downstream piezoelectric transducer, the valve comprising a movable member which extends in the conduit and for which a current position can be regulated in order to control the current flow rate of the fluid;
a position sensor configured to measure the current position of the movable member;
a processing circuit which, if the current position of the movable member is such that the current flow rate cannot be measured by the ultrasonic measuring device, is configured to evaluate the current flow rate as a function of the current position of the movable member and of a pressure value which is representative of a difference between a second pressure of the fluid in the conduit downstream of the valve and a first pressure of the fluid in the conduit upstream of the valve, the first pressure being evaluated from a first electrical impedance of the upstream piezoelectric transducer and the second pressure being evaluated from a second electrical impedance of the downstream piezoelectric transducer.

The ultrasonic fluid meter in accordance with the invention is therefore particularly advantageous because when the current position of the movable member of the valve is such that the current flow rate cannot be measured via the ultrasonic measuring device, then the current flow rate is evaluated as a function of the current position of the movable member and of a pressure value which is calculated from the first pressure which itself is evaluated from the first electrical impedance of the upstream transducer and from the second pressure which itself is evaluated from the second electrical impedance of the downstream transducer. In this case, the ultrasonic fluid meter in accordance with the invention does not require the ultrasonic measuring device in order to be operative.

The ultrasonic fluid meter in accordance with the invention is therefore capable of measuring and regulating the flow rate of the fluid irrespective of the state of the valve (open, closed, partially open).

In one embodiment, the first electrical impedance is an electrical impedance of the upstream transducer at an excitation frequency of the upstream transducer and of the downstream transducer, and the second electrical impedance is an electrical impedance of the downstream transducer at said excitation frequency.

In one embodiment, the processing circuit is configured to:
excite the upstream transducer at frequencies included in a first predetermined frequency range in order to evaluate a first function for the first impedance as a function of frequency over said first range;
excite the downstream transducer at frequencies included in a second predetermined frequency range in order to evaluate a second function for the second impedance as a function of frequency over said second range;
from the first function, evaluate a first offset with respect to a first reference frequency of a first resonance frequency or of a first antiresonance frequency of the upstream transducer;

from the second function, evaluate a second offset with respect to a second reference frequency of a second resonance frequency or of a second antiresonance frequency of the downstream transducer;

evaluate the first pressure from the first offset and the second pressure from the second offset.

In one embodiment, the processing circuit is configured, if the current position of the movable member is such that the current flow rate can be measured by the ultrasonic measuring device, to:

evaluate a pressure of the fluid at zero flow rate;

estimate the temperature of the fluid by using the pressure of the fluid at zero flow rate;

produce a first flow rate value from the time of flight of the ultrasonic signals between the first transducer and the second transducer and from the temperature of the fluid.

In one embodiment, the processing circuit is furthermore configured to:

produce a second flow rate value from the current position of the movable member and from the pressure value;

produce a consolidated flow rate value from the first flow rate value and from the second flow rate value.

In one embodiment, in order to evaluate the pressure of the fluid at zero flow rate, the processing circuit is configured to:

wait until the current flow rate becomes zero;

then evaluate the first pressure from the first impedance or the second pressure from the second impedance.

In one embodiment, the fluid is a compressible fluid, the fluid meter further comprising a temperature sensor configured to measure a temperature of the fluid in the conduit, the processing circuit being configured such that, if the current position of the movable member is such that the current flow cannot be measured by the ultrasonic measuring device, it also uses the temperature of the fluid to evaluate the current flow rate.

In one embodiment, the valve is a ball valve.

A method for measuring a current flow rate of a fluid is also provided, carried out in the processing circuit of an ultrasonic fluid meter as described above, and, if the current position of the movable member is such that the current flow rate cannot be measured by the ultrasonic measuring device, comprising the step of evaluating the current flow rate as a function of the current position of the movable member and of the pressure value which is representative of the difference between the second pressure and the first pressure.

In one embodiment, in the measurement method as described above, the first electrical impedance is an electrical impedance of the upstream transducer at an excitation frequency of the upstream transducer and of the downstream transducer, and the second electrical impedance is an electrical impedance of the downstream transducer at said excitation frequency.

In one embodiment, the measurement method as described above comprises the steps of:

exciting the upstream transducer at frequencies included in a first predetermined frequency range and evaluating a first function of the first impedance as a function of frequency over said first range;

exciting the downstream transducer at frequencies included in a second predetermined frequency range and evaluating a second function of the second impedance as a function of frequency over said second range;

from the first function, evaluate a first offset with respect to a first reference frequency of a first resonance frequency or of a first antiresonance frequency of the upstream transducer;

from the second function, evaluate a second offset with respect to a second reference frequency of a second resonance frequency or of a second antiresonance frequency of the downstream transducer;

evaluate the first pressure from the first offset and the second pressure from the second offset.

In one embodiment, if the current position of the movable member is such that the current flow rate can be measured by the ultrasonic measuring device, the measurement method as described above comprises the steps of using the ultrasonic measuring device to measure the current flow rate;

waiting until the current flow rate becomes zero;

then evaluating the first pressure from the first impedance or the second pressure from the second impedance, and thus evaluating the pressure of the fluid at zero flow rate;

estimating the temperature of the fluid by using the pressure of the fluid at zero flow rate;

estimating a first flow rate value from the time of flight of the ultrasonic signals between the first transducer and the second transducer and from the temperature of the fluid.

In one embodiment, the measurement method as described above further comprises the steps of:

producing a second flow rate value from the current position of the movable member and from the pressure value;

producing a consolidated flow rate value from the first flow rate value and from the second flow rate value.

In one embodiment, the measurement method as described above further comprises the steps of:

defining a time interval between a time t1 and a time t2, such that at time t1, a difference between the second pressure and the first pressure changes from a zero value to a value which is higher than a predefined threshold, and at time t2, the difference between the second pressure and the first pressure changes from a second value which is higher than the predefined threshold to the zero value, integrating the current flow rate over the time interval and thus evaluating a volume of fluid distributed via the conduit.

In addition, a computer program is provided, comprising instructions which cause the processing circuit of the meter as described above to execute the steps of the detection method as described above.

There is also provided a computer-readable storage medium, storing the above-described computer program.

In addition, a method for regulating a current flow rate is proposed, which is carried out in the processing circuit of an ultrasonic fluid meter as described above and comprising the steps of:

acquiring a flow rate setpoint;

estimating the current flow rate using the measurement method as described above;

adapting the current position of the movable member as a function of a difference between the flow rate setpoint and the current flow rate.

A computer program is also provided which comprises instructions which cause the processing circuit of the meter as described above to execute the steps of the regulation method as described above.

There is also provided a computer-readable storage medium, storing the above-described computer program.

The invention will be best understood in the light of the following description of particular non-limiting embodiments of the invention.

BRIEF DESCRIPTION OF THE DRAWING

Reference will be made to the accompanying drawings, among which:

FIG. 7 shows a table for a third reference table;

DETAILED DESCRIPTION OF THE INVENTION

Figure 1:
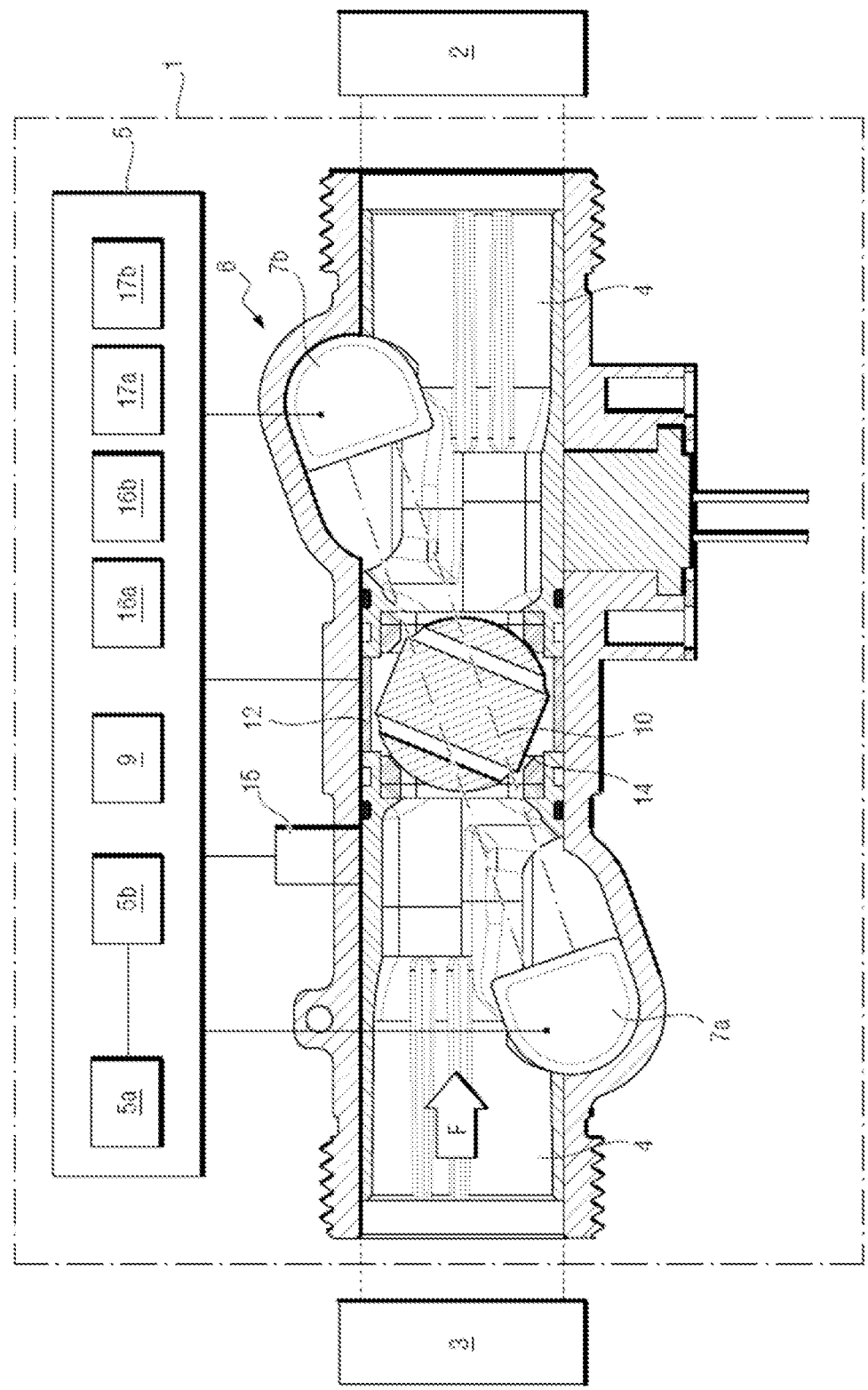
FIG. 1 shows an ultrasonic fluid meter in accordance with a first embodiment of the invention.
Figure 2:
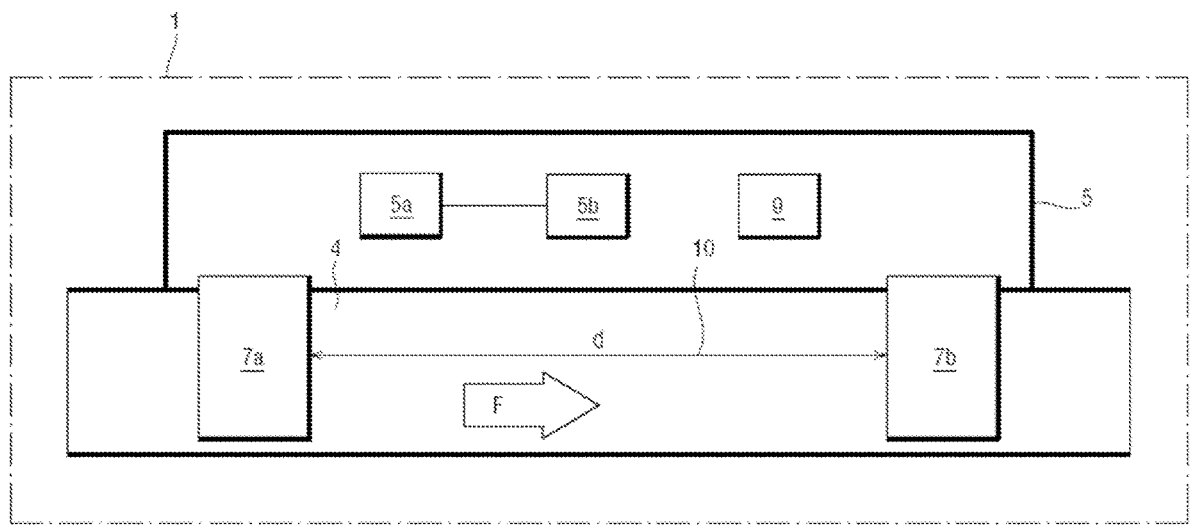
FIG. 2 diagrammatically shows two transducers in the conduit.

With reference to FIGS. 1 and 2, the invention is embodied in an ultrasonic water meter 1. Here, the meter 1 is a water meter which is used to measure the water consumption of an installation 2 of a subscriber. The water is supplied to the installation 2 of the subscriber by a water distribution network 3.

The meter 1 comprises a conduit 4 in which the water supplied by the network 3 to the installation 2 flows. The water flows in the conduit 4 from upstream to downstream, as indicated by the direction of the arrow F. Here, the term "upstream" means on the side of the network 3, and the term "downstream" means on the side of the installation 2.

The meter 1 comprises a processing circuit 5. The processing circuit 5 comprises at least one processing component 5a which, for example, is a "general-purpose" processor, a processor specialized in signal processing (or digital signal processor (DSP)), a microcontroller, or in fact a programmable logic circuit such as a FPGA (or field programmable gate array) or an ASIC (or application-specific integrated circuit). The processing circuit 5 also comprises one or more memories 5b which are connected to or integrated into the processing component 5. At least one of these memories forms a computer-readable storage support on which at least one computer program comprising instructions which cause the processing component to execute at least some of the steps of the measurement method and the regulation method, which will be described below, are stored.

The meter 1 also comprises an ultrasonic measuring device 6. The ultrasonic measuring device 6 is used "by default" in order to measure the flow rate of water supplied to the installation 2 by the network 3.

The ultrasonic measuring device 6 includes an upstream transducer 7a and a downstream transducer 7b. The ultrasonic measuring device 6 also includes a measurement module 9 connected to the upstream transducer 7a and to the downstream transducer 7b. Here, the processing module 9 is implemented in the processing circuit 5.

The upstream transducer 7a and the downstream transducer 7b are (but not necessarily) paired. In this example, the upstream transducer 7a and the downstream transducer 7b are piezoelectric transducers.

Each transducer 7a, 7b acts in succession as an emitter and a receiver of ultrasonic signals.

The processor module 9 generates an electrical excitation signal and delivers the electrical excitation signal to the emitter. The emitter then generates an ultrasonic signal. The receiver receives the ultrasonic signal after it has travelled in the fluid along a predefined path 10, and the processing module 9 measures the time of flight.

The predefined path 10 here is a straight path (inclined with respect to a longitudinal axis of the conduit 4, as is the case in FIG. 1, or parallel to said axis, as is the case in FIG. 2). The predefined path 10 has a length d, which is very precisely known.

Thus, firstly, the upstream transducer 7a emits the ultrasonic signal which is received by the downstream transducer 7b. The processing module 9 measures the time of flight from upstream to downstream, $TOF_{UP}$.

Next, the downstream transducer 7b emits the ultrasonic measurement signal which is received by the upstream transducer 7a. The processing module 9 measures the time of flight from downstream to upstream, $TOF_{DN}$.

We have:

$$TOF_{UP} = \frac{d}{c - v_{fluid}}$$

$$TOF_{DN} = \frac{d}{c + v_{fluid}}$$

where c is the speed of sound in water, d is the length of the predefined path 10, and $v_{fluid}$ is the speed of flow of the water.

We now define $\Delta_{TOF}$ and $\Sigma_{TOF}$:

$\Delta_{TOF} = TOF_{DN} - TOF_{UP}$ $\Sigma_{TOF} = TOF_{DN} + TOF_{UP}$

The processing module 9 calculates the speed of sound via the mean of the two times of flight (outward and return), which is independent of the flow of the fluid:

$$c = \frac{2d}{\sum_{TOF}}$$

The processing module 9 calculates the speed of flow of the water as follows:

$$v_{fluid} = \frac{1}{2} \cdot \left( \frac{d}{TOF_{UP}} - \frac{d}{TOF_{DN}} \right)$$

$$v_{fluid} = \frac{d}{2} \cdot \frac{TOF_{DN} - TOF_{UP}}{TOF_{UP} \cdot TOF_{DN}}$$

$$v_{fluid} \approx 2d \cdot \frac{\Delta_{TOF}}{\sum_{TOF}^2}$$

The temperature is calculated from the speed of sound, for example via a polynomial approximation, without taking into account the pressure if this is not measured:

$$T = \sum_{i=0}^{N} a_i \times c^i$$

From these data, the flow rate Q of the water is calculated as follows:

$$Q = K_T \cdot v = K_T \cdot \frac{\Delta_{TOF}}{(\sum_{TOF})^2} = K_T \cdot \frac{\Delta_{TOF}}{2d} \cdot c^2$$

The factor $K_T$ is homogeneous at a surface and, inter alia, is correlated with the section of the conduit 4. The factor $K_T$ is derived from a first reference table, as a function of the temperature of the water. The first reference table is stored in a memory of the processing circuit 5. For a measured $\Delta_{TOF}$, the temperature is calculated via the speed of sound. Next, the $K_T$ is obtained via the first reference table as a function of the previously calculated temperature.

Figure 3:
FIG. 3 shows a table for a second reference table.

With reference to FIG. 3, in order to limit the complex calculations (and therefore the calculation time and the energy consumption), it is possible to use a second reference table 11 in order to estimate the flow rate of the water. By way of example, this second reference table 11 is in two dimensions: temperature vs flow rate. The second reference table 11 is stored in a memory 5b of the processing circuit 5.

Here, the second reference table 11 comprises a single table.

As an example, if the temperature is equal to $T_1$, and if $\Delta_{TOF}$ is equal to $\Delta TOF_{11}$, the processing module 9 will deduce therefrom that the flow rate is equal to $D_1$.

The meter 1 also comprises a valve 12 which makes it possible to regulate, limit or shut off the flow of water. The valve 12 can be seen in FIG. 1, but is not shown in FIG. 2.

The valve 12 is positioned between the two transducers 7a, 7b along a length of the conduit 4.

The valve 12 is a motorized (electromechanical) multi-position valve. The valve 12 comprises a movable member which extends in the conduit 4 and for which a current position can be regulated in order to control the current flow rate of the fluid. Here, the valve 12 is a ball valve and the movable member is therefore a ball 14; the current position of the ball 14 is an angular position.

The counter 1 also comprises a position sensor 15 configured to measure the current position of the ball 14.

The meter 1 additionally comprises communication means which can be used to implement any type of communication, for example communications via a 2G, 3G, 4G, Cat-M or NB-IOT cellular network, communications in accordance with the LoRa protocol, radio communications in accordance with the Wize standard operating at a frequency of 169 MHz, etc.

The communication means in particular enable the processing circuit 5 to receive a flow rate setpoint from outside. As an example, the flow rate setpoint is transmitted by an information system (IS) of the water supplier or the network manager, possibly via a data concentrator.

The processing circuit 5 acquires the flow rate setpoint, the current position of the ball 14 (measured by the position sensor 15), and can therefore regulate the current flow rate by modifying the angular position of the ball 14 if necessary. It should be noted that the processing circuit 5 is also capable of controlling the valve 12 autonomously (i.e. without receiving a setpoint from outside). It should also be noted that the valve 12 could be managed via a different setpoint, for example via an angular position setpoint for the ball 14.

As was shown above, the ultrasonic measuring device 6 is used by default to measure the current flow rate.

However, when the valve 12 is not sufficiently open (i.e. for certain angular positions of the ball 14), there is a possibility that the ball 14 will prevent the ultrasonic signals from travelling between the transducers 7a, 7b: the valve 12 obstructs the ultrasound field and the water flow rate cannot then be measured by the ultrasound measuring device 6. Knowing that the integration of additional sensors (for example, a pressure sensor) into the meter 1 is limited in certain cases, (in particular due to constraints of spatial dimensions, sealing, load drop, aging, fouling, cost, etc.), the processing circuit 5 is configured to use the upstream transducer 7a and the downstream transducer 7b directly to respectively evaluate a first pressure P1 and a second pressure P2 from which it is possible to estimate the current flow rate of the water in the conduit 4. The first pressure P1 is equal to the instantaneous pressure of the fluid in the conduit 4 upstream of the valve 12 and the second pressure P2 is equal to the instantaneous pressure of the fluid in the conduit 4 downstream of the valve 12. The first pressure P1 is evaluated from a first electrical impedance Z1 of the upstream transducer 7a and the second pressure P2 is evaluated from a second electrical impedance Z2 of the downstream transducer 7b.

The principle making it possible to evaluate a pressure of a medium in which a piezoelectric transducer is placed via an electrical impedance of said piezoelectric transducer is described in detail at the end of the description.

Specifically, the valve 12 acts as a pressure-reducing device, amplifying the load drop between its inlet and its outlet.

Thus, the current flow rate Q (in litres/hour) is expressed on the basis of a pressure value $\Delta P$ which is representative of a difference between the second pressure P2 and the first pressure P1.

Here, the pressure value $\Delta P$ is equal to the difference between the second pressure P2 and the first pressure P1: $\Delta P = P2 - P1$.

We have:

$$Q = K \times \sqrt{\Delta P}$$

K is a factor related to the speed of the fluid flow, the temperature, the geometry of the conduit, etc.

When the valve 12 is open or partially open and the current flow rate is zero, the pressure is identical on either side of the valve 12, P1=P2, and therefore the pressure value ΔP is zero. The first pressure P1 evaluated via the upstream transducer 7a and the second pressure P2 evaluated via the downstream transducer 7b are then both equal to the pressure of the fluid at zero flow rate or the static pressure of the network.

For a given static pressure of the network with the valve closed, opening the valve will cause the pressure to vary (drop): there will be a difference between the pressure at zero flow rate and the pressure with a flow rate.

Figure 4:
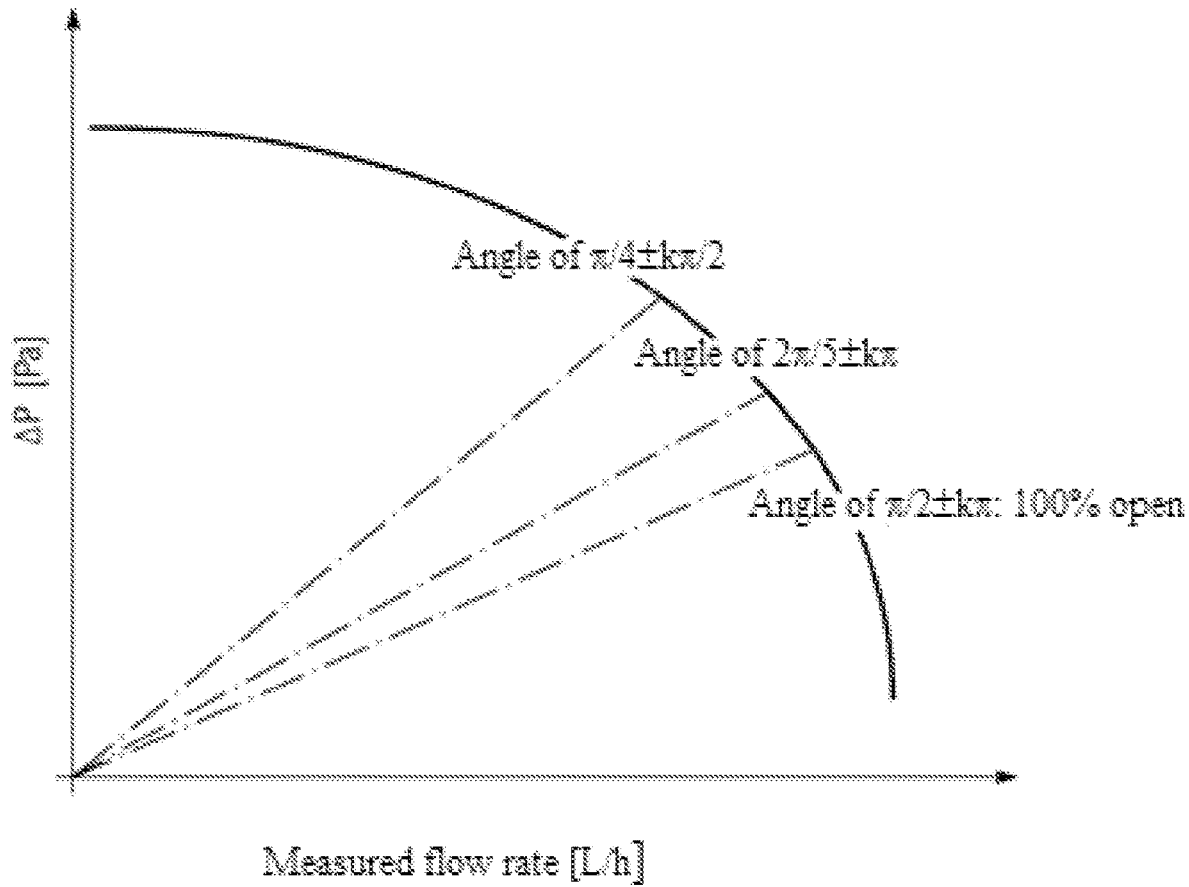
FIG. 4 shows a graph comprising a plot for the value of the pressure P as a function of the current flow rate.

The change in section (conduit, valve, etc.) generates variations in speed and therefore in pressure. The pressure value ΔP=P2−P1 is therefore a reflection of the current flow rate. FIG. 4 graphically shows the variation in the pressure value ΔP as a function of the current flow rate, showing particular values for the current position (angular position) of the ball 14:

$$\frac{\pi}{2}+k\pi, \frac{2\pi}{5}+k\pi, \frac{\pi}{4}+k\frac{\pi}{2},$$

where k is a relative integer.

When the valve 12 is closed (the state of the valve must be known), the current flow rate is zero, but the pressure value ΔP may be non-zero. The first pressure P1 evaluated via the upstream transducer 7a is then equal to the pressure of the fluid at zero flow rate (static pressure of the network) and the second pressure P2 evaluated via the downstream transducer 7b is then equal to the pressure between the valve 12 and the installation 2.

When the current position of the ball 14 is such that the current flow rate cannot be measured by the ultrasonic measuring device 6, i.e. when the valve 12 is in a semi-open position and ultrasonic measurement is impossible, the processing circuit 5 evaluates the current flow rate as a function of the current angular position of the ball 14 and the pressure value ΔP.

Figure 5:
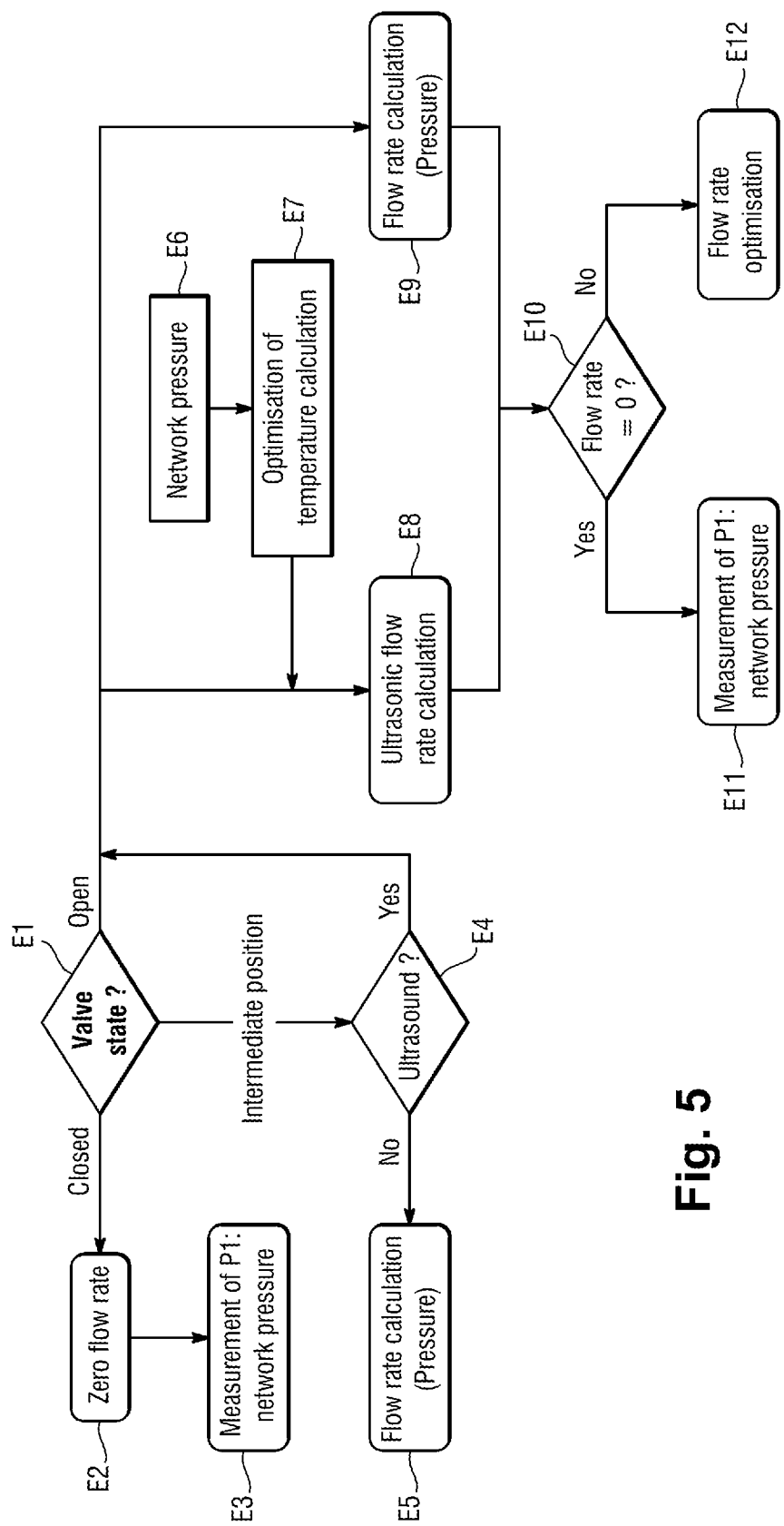
FIG. 5 shows the steps of a measurement method.

Referring now to FIG. 5, a more detailed description of the measurement method implemented by the processing circuit 5 in this case will now be described.

Firstly, the processing circuit 5 acquires the current angular position of the ball 14 via the position sensor 15 (step E1).

If the valve 12 is closed, the processing circuit 5 acquires at least one value for the first pressure P1 produced via the upstream transducer 7a (step E2), and thus evaluates the water pressure at zero flow rate (step E3), i.e. the network pressure.

If the valve 12 is partially open, the processing circuit 5 verifies whether the ultrasonic signals can travel freely between the transducers 7a, 7b, and therefore whether the current position of the ball 14 is such that the current flow rate can or cannot be measured by the ultrasonic measuring device 6 (step E4). If this is not the case, the processing circuit 5 evaluates the current flow rate as a function of the current angular position of the ball 14 and of the pressure value ΔP=P2−P1 (step E5).

Figure 6:
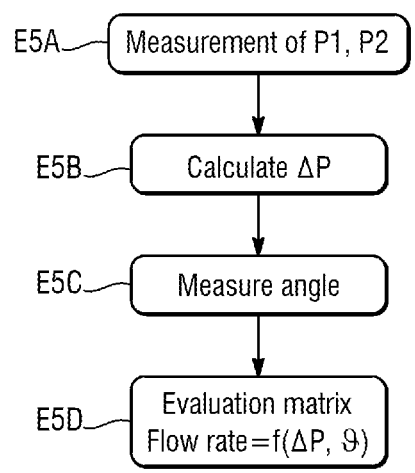
FIG. 6 shows the steps of a measurement method starting from the pressure value ΔP.

Step E5 will now be described in more detail with reference to FIG. 6; the processing circuit 5 therefore acquires at least one value for the first pressure P1 produced via the upstream transducer 7a and at least one value for the second pressure P2 produced via the downstream transducer 7b (step 5A).

Subsequently, the processing circuit 5 calculates the pressure value ΔP=P2−P1 (step 5B).

Preferably, the processing circuit 5 acquires the current angular position of the ball 14 again via the position sensor 15 (step 5C).

In order to estimate the current flow rate, the processing circuit 5 then uses a third reference table 18 which is stored in a memory 5b of the processing circuit 5 (step 5D).

With reference to FIG. 7, the third reference table 18 is in two dimensions, 2D, for example: pressure value ΔP as a function of the current angular position of the ball 14 and the flow rate.

As an example, if the current angular position of the ball 14 is θ=θ$_3$, and ΔP=P2−P1=ΔP$_{31}$, the processing circuit 5 estimates that the current flow rate is equal to D1. Conversely, the processing circuit 5 can estimate the necessary angular position for the ball 14 as a function of a pressure value ΔP and of a desired flow rate.

We now return to FIG. 5 and, more particularly, to step E4 of the measurement method.

If the valve 12 is partially open and the ultrasonic signals can travel freely between the transducers 7a, 7b, or if the valve 12 is (completely) open, then the current angular position of the ball 14 is such that the current flow rate can be measured by the ultrasonic measuring device 6.

The processing circuit therefore uses the ultrasonic measuring device 6 to measure the flow rate (step E8).

Advantageously, when the processing circuit 5 uses the ultrasonic measuring device 6 to measure the current flow rate, the processing circuit 5 can consolidate the measurement of the current flow rate, produced by the ultrasonic measuring device 6, by using the water pressure.

As was discussed above, the ultrasonic measuring device 6 uses the ultrasonic signals to calculate the speed of sound in water and the speed of flow of water in the conduit 4. In fact, the difference between the outward and return times for the ultrasonic signals reflects the velocity of the flow. The sum of the outward and return times reflects the temperature of the water.

In order to obtain a very accurate measurement of the flow rate, it is therefore preferable to know the temperature, the speed of sound in the water, and the pressure of the water in the conduit 4.

In general, the pressure is considered to be negligible. However, the speed of sound in water (as in any fluid) is a function of the temperature and the pressure, inter alia.

Thus, at constant temperature T, the speed c(T,P) of sound in water varies as a function of the pressure P as indicated in the equation of Belogol'skii et al's equation:

$$c(T,P)=c(T,0)+M_1(T)(P-0.101325)+M_2(T)(P-0.101325)^2+M_3(T)(P-0.101325)^3$$

$$c(T,0)=a_{00}+a_{10}T+a_{20}T^2+a_{30}T^3+a_{40}T^4+a_{50}T^5$$

$$M_1(T)=a_{01}+a_{11}T+a_{21}T^2+a_{31}T^3$$

$$M_2(T)=a_{02}+a_{12}T+a_{22}T^2+a_{32}T^3$$

$$M_3(T)=a_{03}+a_{13}T+a_{23}T_2+a_{33}T^3$$

The coefficients $a_{00}$, $a_{10}$, $a_{20}$, etc. are provided in the appendix to the present description.

Figure 8:
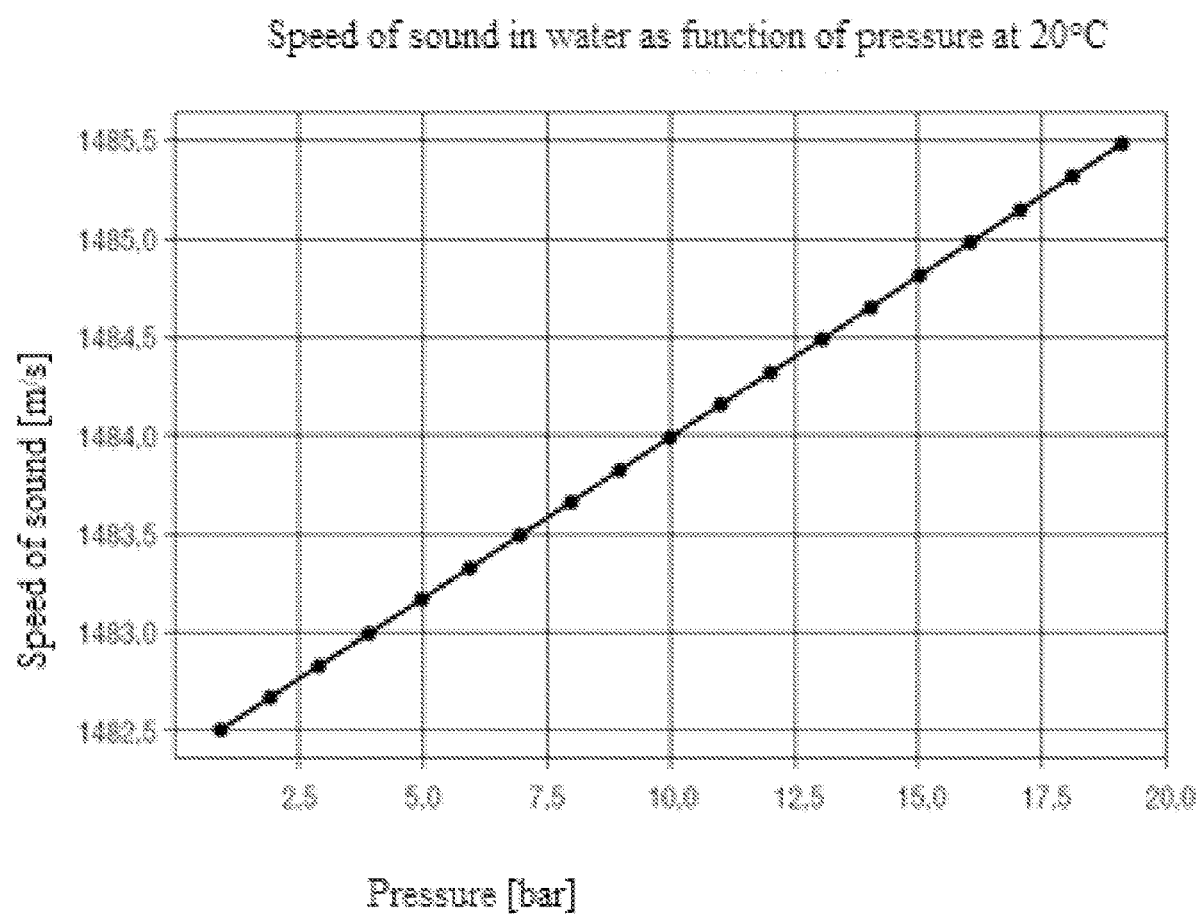
FIG. 8 shows a graph comprising a plot of the speed of sound in water as a function of pressure at 20° C.

It can be seen in FIG. 8 that the speed of sound in water varies as a function of the pressure.

Thus, at 20° C., between a medium at 1 bar and a medium at 16 bar (maximum pressure of a residential water network), the speed of sound will vary from 1482.5 m/s to 1484.99 m/s (difference of 2.48 m/s). This difference corresponds to a temperature difference of 0.82° C.

This difference may introduce an error into the calculation of the flow rate via the second reference table 11 (FIG. 3).

It is therefore advantageous to take the pressure during calibration and during measurement into consideration in order to improve the characterization of the medium and the calculation of the flow rate.

It is then possible to replace the second reference table 11 with a three-dimensional table which comprises a table similar to the table in FIG. 3 for different predefined pressure values.

In the case in which the pressure of the fluid at zero flow rate (static pressure of the network) has not been measured previously in step E3, the processing circuit 5 can wait until the current flow rate is zero.

When the current flow rate is zero, the processing circuit acquires at least one value for the first pressure P1 produced via the upstream transducer 7a or at least one value for the second pressure P2 produced via the transducer 7b, and thus evaluates the pressure of the fluid at zero flow rate (step E6).

The processing circuit 5 then uses the speed of sound in water and the pressure of the fluid at zero flow rate to accurately estimate the temperature of the fluid (step E7).

The processing circuit 5 then uses the second reference table 11 to estimate the first flow rate value (step E8).

It has just been seen that, if the state of the valve 12 is such that the ultrasonic measuring device can be used, the processing circuit 5 uses the flow rate to measure the current flow rate.

Advantageously, if the ultrasonic measuring device 6 can be used, the processing circuit 5 uses the ultrasonic measuring device 6 to measure a first flow rate value (step E8) and also uses the downstream transducer 7a and the upstream transducer 7b to respectively evaluate the first pressure P1 and the second pressure P2 and thus measure a second flow rate value (step E9).

The processing circuit 5 also uses the upstream transducer 7a and the downstream transducer 7b to measure the second flow rate value (step E9). To this end, the processing circuit 5 carries out the steps E5A, E5B, E5C and E5D in succession.

The processing circuit 5 checks whether the first flow rate value and/or the second flow rate value are zero (step E10).

If this is the case (zero current flow rate), the processing circuit 5 then acquires at least one value for the first pressure P1 produced via the upstream transducer 7a or at least one value for the second pressure P2 produced via the downstream transducer 7b, and therefore evaluates the pressure of the water at zero flow rate (step E11), i.e. the pressure of the network.

If this is not the case (non-zero current flow rate), the processing circuit 5 produces a consolidated flow rate value from the first flow rate value (measured via the ultrasonic measuring device 6) and from the second flow rate value (measured from the pressure value ΔP determined from the transducers 7a, 7b) (step E12). Preferably, the consolidated flow rate value is an arithmetic mean value of the first flow rate value and the second flow rate value. The consolidated flow rate value could be another type of digital value, for example, the consolidated flow rate value may be a weighted mean value of the first flow rate value and the second flow rate value.

If necessary, the processing circuit 5 may also regulate the current flow rate.

Figure 9:
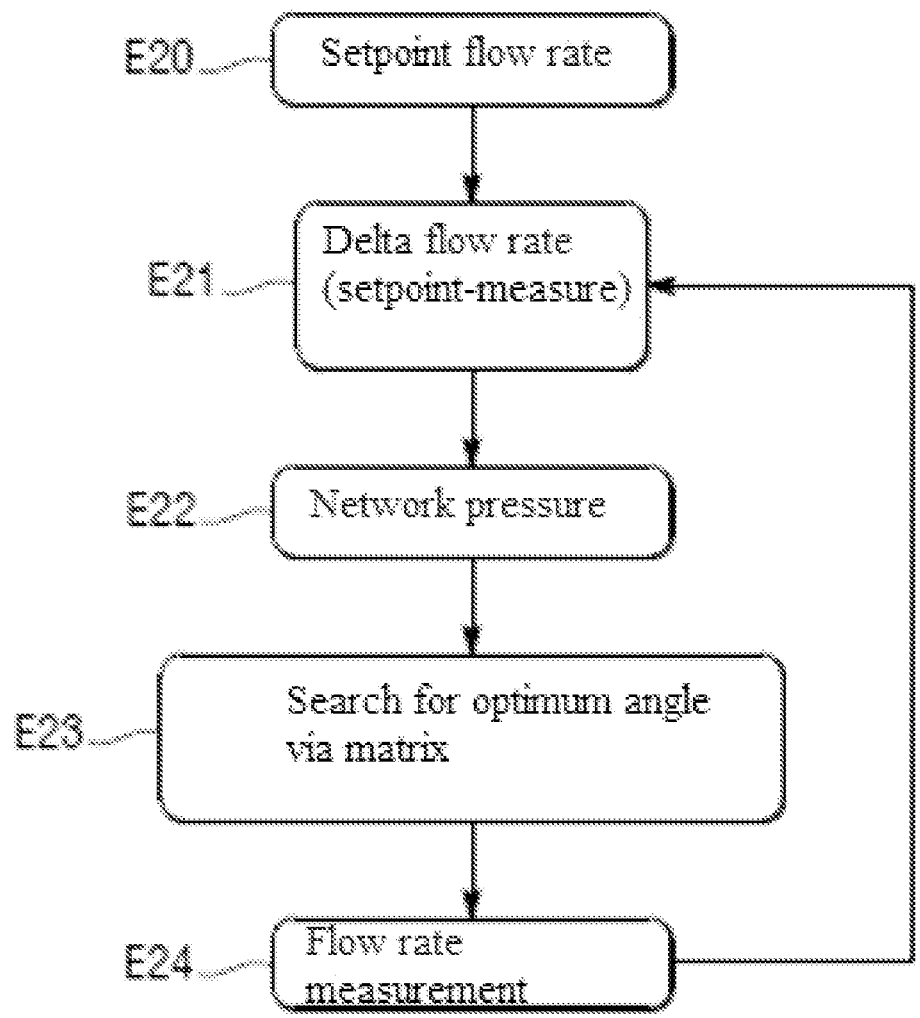
FIG. 9 shows the steps in a regulation method.

To this end, referring now to FIG. 9, the processing circuit 5 acquires a flow rate setpoint (step E20).

The processing circuit 5 then measures the current flow rate using the measurement method which has just been described, then calculates the difference between the flow rate setpoint and the current flow rate (step E21).

The processing circuit 5 then adapts the current position of the ball 14 as a function of this difference.

To this end, the processing circuit 5 acquires the pressure of the fluid at zero flow rate (static pressure of the network previously measured via the measurement method)—step E22, then determines, in the third reference table 18, the optimum angular position of the ball 14 which makes it possible to confer on the current flow rate the value for the flow rate setpoint (step E23).

The processing circuit 5 then regulates the valve 12 to bring the ball 14 into the optimum angular position.

The processing circuit 5 then measures the current flow rate again (step E24), and the regulation method goes back to step E21. The servo-control continues until a negligible difference between the current flow rate and the flow rate setpoint is obtained.

Advantageously, the processing circuit 5 can use the first pressure P1 evaluated via the upstream transducer 7a and the second pressure P2 evaluated via the downstream transducer 7b to estimate the volume of water dispensed via the conduit 4.

In fact, in the presence of a flow rate, the value for the pressure ΔP will vary.

Figure 10:
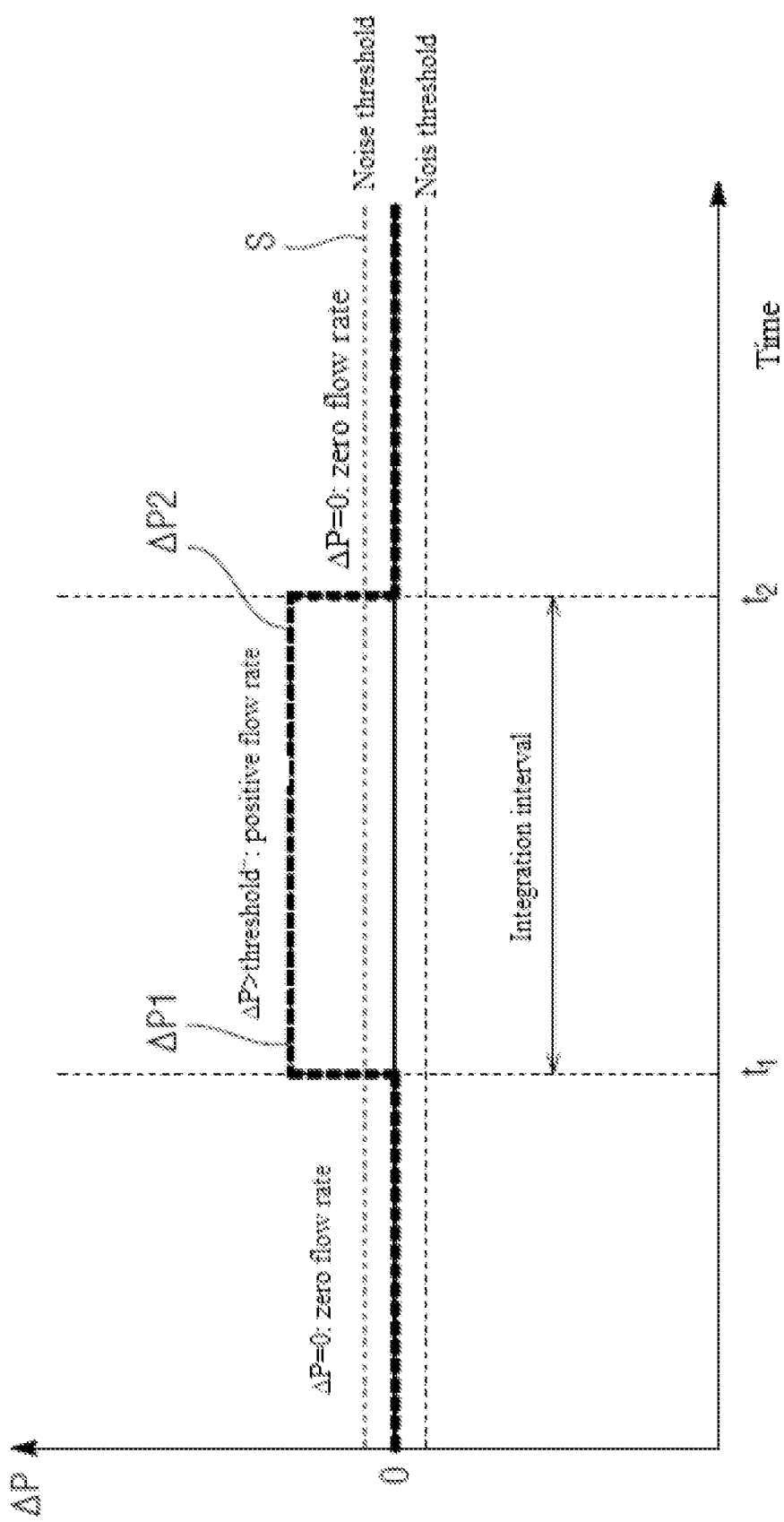
FIG. 10 shows a graph in which the change in the pressure measured in the conduit when the installation starts and then stops consuming water is shown.

To this end, with reference to FIG. 10, the processing circuit 5 detects a time interval which extends between a time t1 and a time t2 such that:
  at time t1, the pressure value ΔP changes from a zero value to a first value ΔP1 which is higher than a predefined threshold S. The predefined threshold S here is a noise threshold due to the measurement noise and to uncertainties during the evaluation of the first pressure P1 via the upstream transducer 7a and of the second pressure P2 via the downstream transducer 7b.
  at time t2, the pressure value ΔP changes from a second value ΔP$_2$ which is higher than the threshold S (here, it should be noted that the second value ΔP$_2$ is equal to the first value ΔP1) to a zero value.

The accuracy of this time interval [t1, t2] depends on the frequency at which the first pressure P1 and the second pressure P2 are respectively evaluated via the upstream transducer 7a and the downstream transducer 7b.

The processing circuit 5 then integrates the current flow rate over the time interval [t1; t2] in order to calculate the volume consumed:

$$\text{Volume} = \int_{t1}^{t2} Q \cdot dt,$$

where Q is the current flow rate (in litres/hour).

How the first pressure P1 and the second pressure P2 are respectively evaluated from the first electrical impedance Z1 of the upstream transducer 7a and from the second electrical impedance Z2 of the downstream transducer 7b will now be described.

A conventional piezoelectric transducer is generally in the form of a disk comprising faces. The electrical impedance at the terminals of a piezoelectric transducer is therefore a function of the physical properties of the disk, but also of the mechanical impedance of one or more media with which the faces of the disk are in contact. The mechanical impedance $Z_m$ (N·s/m) of a medium is expressed by the following expression:

$$Z_m = S \cdot \rho \cdot c$$

S is the section of the conduit (m²), ρ is the density of the medium (kg/m³) and c is the speed of sound in the medium (m/s).

The mechanical impedance $Z_m$ of a medium is also a function of the pressure of the medium. As an example, if the fluid is a perfect gas, we have:

$$P \cdot V = n \cdot R \cdot T$$

P is the pressure (Pa), V is the volume (m³), n is the quantity of material (mol), R is the ideal gas constant (≈8.314 J/K/mol) and T is the absolute temperature (K).

It is also known that:

$$n = \frac{\rho \cdot V}{M}$$

M is the molar mass (kg/mol) and ρ is the density (kg/m³). Thus, we have:

$$P = \frac{\rho \cdot R \cdot T}{M}$$

Knowing that the electrical impedance of a piezoelectric transducer depends on the mechanical impedance of a medium in which it is placed and that the mechanical impedance of the medium itself depends on the pressure of said medium, it is possible to state that the frequency response of a piezoelectric transducer is a function of the pressure of the medium.

The variation in the frequency response of a piezoelectric transducer can be observed directly by measuring the electrical impedance of the piezoelectric transducer (magnitude as a function of frequency), or in fact by measuring the impulse response of the piezoelectric transducer (transfer function, gain, bandwidth).

Figure 11:
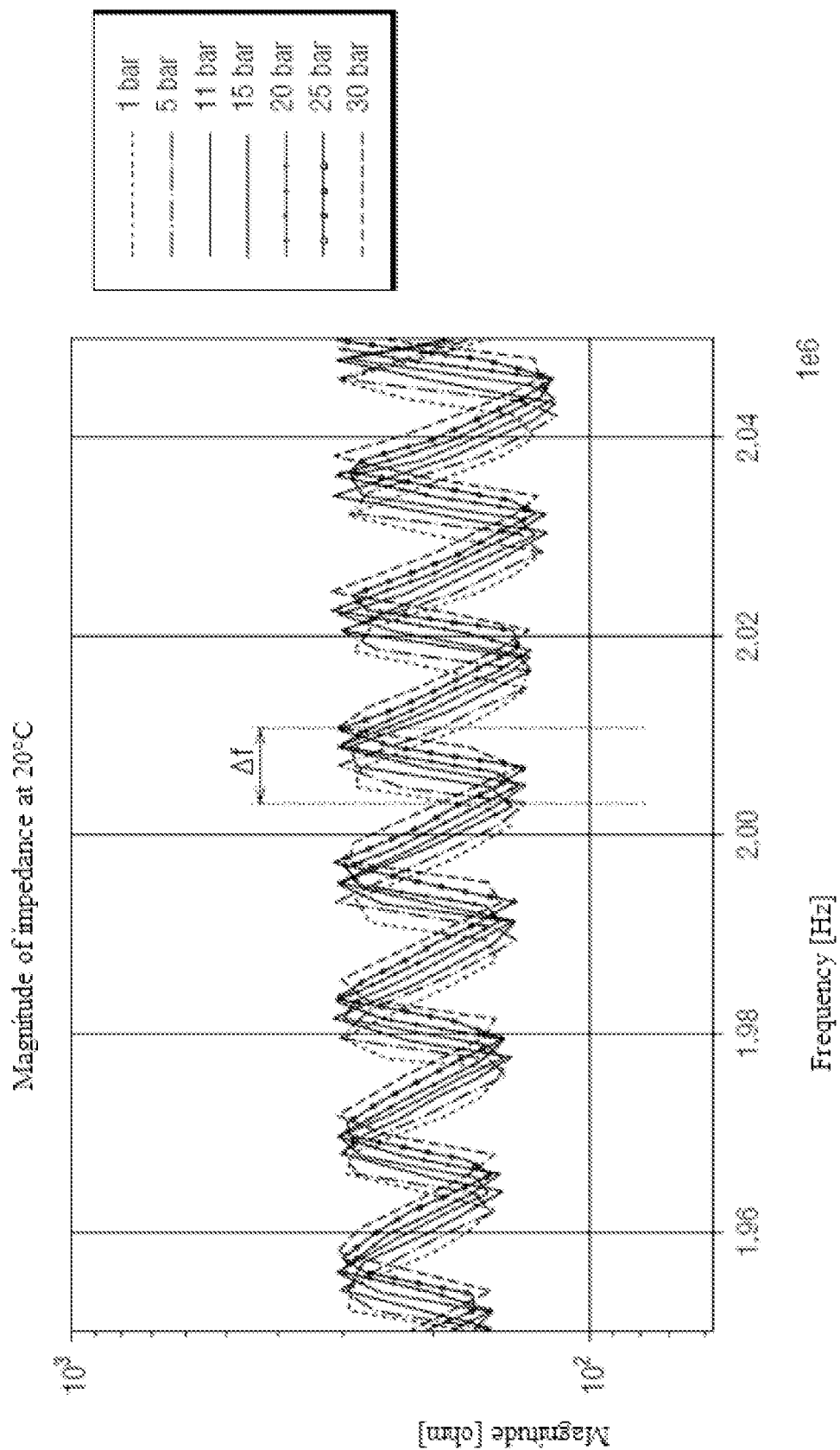
FIG. 11 shows a graph showing plots representing the magnitude of the electrical impedance of a piezoelectric transducer as a function of frequency at different pressure values at 20° C.

Referring to FIG. 11, it can be seen that variations in the pressure of the medium (here, from 1 bar to 30 bar) at constant temperature (here, 20° C.) produce a frequency offset Δf for the electrical impedance measured at the terminals of the piezoelectric transducer. More precisely, it can be seen that increasing the pressure of the medium generates the frequency offset Δf towards the right. The frequency offset Δf is directly proportional to the pressure of the medium. Here, the magnitude of the electrical impedance is measured in the vicinity of an excitation frequency of the piezoelectric transducer which is equal to 2 MHz, and more precisely between 1.96 MHz and 2.04 MHz.

Figure 12:
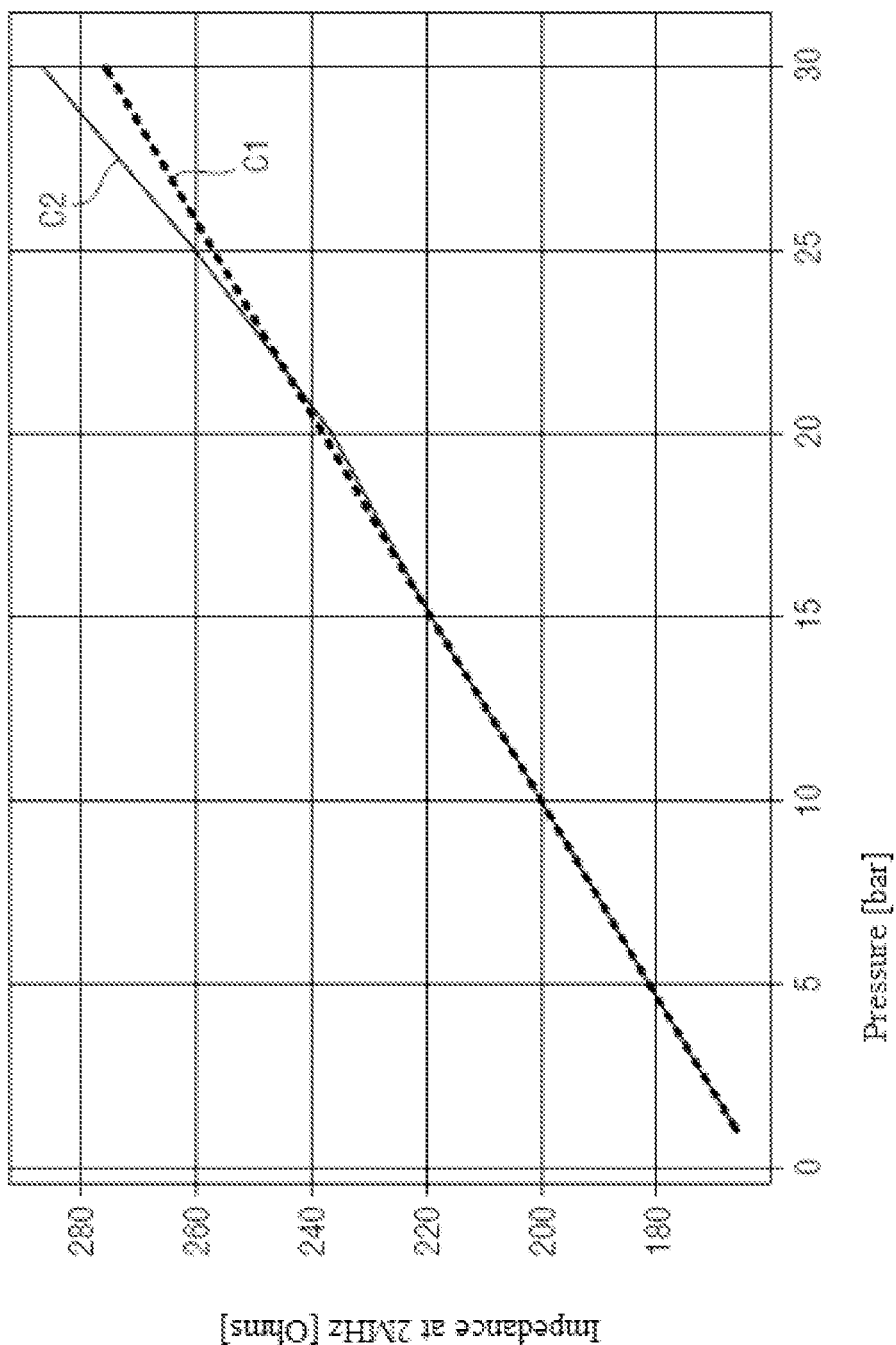
FIG. 12 shows a graph comprising a plot which measures the magnitude of the electrical impedance at 2 MHz of an electrical transducer as a function of pressure and a plot for the corresponding analytical model.

Referring to FIG. 12, it can be seen that the electrical impedance of a piezoelectric transducer at the excitation frequency (here, 2 MHz) and at 20° C. is a function of the pressure of the medium in which the piezoelectric transducer is immersed. In a specific configuration, the electrical impedance at the excitation frequency may be a linear function of the pressure of the medium (but that is not always the case). By eliminating the ultrasonic echoes responsible for the oscillation of the magnitude of the electrical impedance, it is possible to construct an analytical model of the piezoelectric transducer (plot C1), based here on only two measurements of the electrical impedance at the excitation frequency, making it possible to predict the pressure of the medium as a function of the electrical impedance measured at the terminals of the piezoelectric transducer at the excitation frequency.

It should be noted that the analytical model (electrical impedance at 2 MHz-ohm-vs pressure of the medium-bar-) which is constructed thereby (plot C1) is adjusted to the actual measurements made (plot C2). Here, the analytical model of the piezoelectric transducer is calibrated in such a manner that it is a linear model:

$$P = 0.2 \times Z_e + 44.33$$

P is the pressure of the medium (bar) and Ze is the electrical impedance of the piezoelectric transducer at 2 MHz (ohm).

The pressure of the medium can therefore be calculated analytically from the analytical model (mathematical modelling) constructed while taking all the intrinsic and extrinsic parameters (properties of the materials, temperature, etc.) of the piezoelectric transducer (disk) and of the medium or media in which said piezoelectric transducer is placed into consideration.

The analytical model could be constructed during a phase for calibrating the meter 1 and then stored in the memory 5b of the processing circuit 5.

In operation, if the ultrasonic measuring device 6 cannot be used, the processing circuit 5 then determines the first impedance Z1 of the upstream transducer 7a and the second impedance Z2 of the downstream transducer 7b. Here, the first impedance Z1 and the second impedance Z2 are respectively determined at a first excitation frequency of the upstream transducer 7a and at a second excitation frequency of the transducer 7b. Here, it is considered that the first excitation frequency and the second excitation frequency are equal, and thus reference will simply be made to the excitation frequency of the upstream transducer 7a and of the downstream transducer 7b (equal to 2 MHz here).

To this end, the meter 1 further comprises a first voltage sensor 16a, a second voltage sensor 16b, a first current sensor 17a and a second current sensor 17b which here are integrated into the processing circuit (5).

The first voltage sensor 16a is configured for measuring a first electrical voltage V1 at the terminals of the upstream transducer 7a and the first current sensor 17a is configured for measuring a first electrical current I1 flowing through the upstream transducer 7a. Here, V1 and I1 are measured when the upstream transducer 7a is excited by a current/voltage source operating at the excitation frequency.

Similarly, the second voltage sensor 16b is configured for measuring a second electrical voltage V2 across the terminals of the downstream transducer 7b, and the second current sensor 17b is configured for measuring a second electrical current I2 flowing through the downstream transducer 7b. Here, V2 and I2 are measured when the downstream transducer 7b is excited by a current/voltage source operating at the excitation frequency.

The processing circuit 5 then calculates the first electrical impedance Z1 as a function of the first electrical voltage V1 and of the first electrical current I1, Z1=V1/I1 (Ohm's law), and the second electrical impedance Z2 as a function of the second electrical voltage V2 and of the second electrical current I2, Z2=V2/I2 (Ohm's law). It should be recalled that Z1 and Z2 here are the respective electrical impedances of the upstream transducer 7a and of the downstream transducer 7b at the excitation frequency.

Then, the processing circuit 5 uses the analytical model of the transducers 7a, 7b pre-stored in the memory 5b to deduce a value for the first pressure P1 from the calculated value for the second electrical impedance Z1. Similarly, the processing circuit 5 uses the analytical model of the transducers 7a, 7b pre-stored in the memory 5b to deduce a value for the second pressure P2 from the calculated value for the second electrical impedance Z2.

In the measurement method of the invention, the first electrical impedance Z1 is an electrical impedance of the upstream piezoelectric transducer 7a at the excitation frequency of the upstream transducer 7a and of the downstream transducer 7b, and the second electrical impedance Z2 is an electrical impedance of the downstream piezoelectric transducer 7b at said excitation frequency.

In a variation, instead of evaluating the first impedance Z1 and the second impedance Z2 solely at the excitation frequency, the processing circuit may be configured to:
excite the upstream transducer (7a) at frequencies comprised in a first predetermined frequency range and thus evaluate a first function of the first impedance Z1 as a function of the frequency over said first range;
then evaluate, from the first function, a first offset Δf1 (frequency offset) of a first resonance frequency or of a first antiresonance frequency with respect to a first reference frequency. The first reference frequency is a resonance or antiresonance frequency which is measured during the calibration phase of the meter 1 at a plurality of known reference pressures and advantageously also at a plurality of known reference temperatures. Once measured, the first reference frequency is stored in the memory 5b of the processing circuit 5.

In the same manner, the processing circuit 5 may be configured to:
excite the downstream transducer (7b) at frequencies comprised in a second predetermined frequency range (which may or may not be similar to the first predetermined frequency range) and thus evaluate a second function for the second impedance as a function of frequency over said second range;
then evaluate, from the second function, a second offset Δf2 (frequency offset) of a second resonance frequency or of a second antiresonance frequency with respect to a second reference frequency. The second reference frequency is a resonance or antiresonance frequency which is measured here during the calibration phase of the meter 1 at a plurality of known reference pressures, and advantageously also at a plurality of reference temperatures which are also known. Once measured, the second reference frequency is stored in the memory 5b of the processing circuit 5.

Knowing that the first offset Δf1 is proportional to the first pressure P1 and that the second offset Δf2 is proportional to the second pressure P2, the processing circuit 5 can evaluate the first pressure P1 from the first offset Δf1 and evaluate the second pressure P2 from the second offset Δf2.

Referring now to FIG. 11, which represents the magnitude of the impedance of a piezoelectric transducer as a function of frequency, it can be seen that the frequency behaviour of the magnitude consists in alternating maxima and minima. The maxima correspond to resonance frequencies and the minima correspond to antiresonance frequencies. The frequency offset Δf shown in FIG. 11 corresponds here to the offset of a resonance frequency (maximum) when the pressure increases from 1 bar to 30 bar. It is of course possible to evaluate the frequency offset Δf by focussing on an antiresonance frequency (minimum) instead of a resonance frequency.

Here, the predetermined frequency range is a frequency range in the vicinity of the excitation frequency, but that is not necessarily the case.

In accordance with this variation, the measurement method in accordance with the invention comprises the steps of:
from the first electrical impedance Z1, evaluating a first offset Δf1 with respect to a first reference frequency of a first resonance frequency or of a first antiresonance frequency of the upstream transducer 7a;
from the second electrical impedance, evaluating a second offset Δf2 with respect to a second reference frequency of a second resonance frequency or of a second antiresonance frequency of the downstream transducer (7b);
and evaluating the first pressure P1 from the first offset Δf1 and evaluating the second pressure P2 from the second offset Δf2.

The processing circuit 5 could also use a fourth reference table. By way of example, the fourth reference table is in two dimensions: pressure vs. temperature. The fourth reference table is stored in a memory 5b of the processing circuit 5.

The fourth reference table comprises a first table enabling the temperature and the first pressure P1 to be linked via the first electrical impedance Z1 at the excitation frequency, and a second table enabling the temperature and the second pressure P2 to be linked via the second electrical impedance Z2 at the excitation frequency.

The processing circuit 5 therefore uses the fourth reference table to evaluate the first pressure P1 from the first electrical impedance Z1 and the second pressure P2 from the second electrical impedance Z2.

It should be noted that, instead of linking the temperature and the pressure via the electrical impedance at the excitation frequency, the fourth reference table could link the temperature and the pressure via the frequency offset Δf (seen at the level of the magnitude of the electrical impedance of a piezoelectric transducer when the pressure varies).

The fourth reference table could also be more complete by taking the flow rate of the water into account as a parameter.

Figure 13:
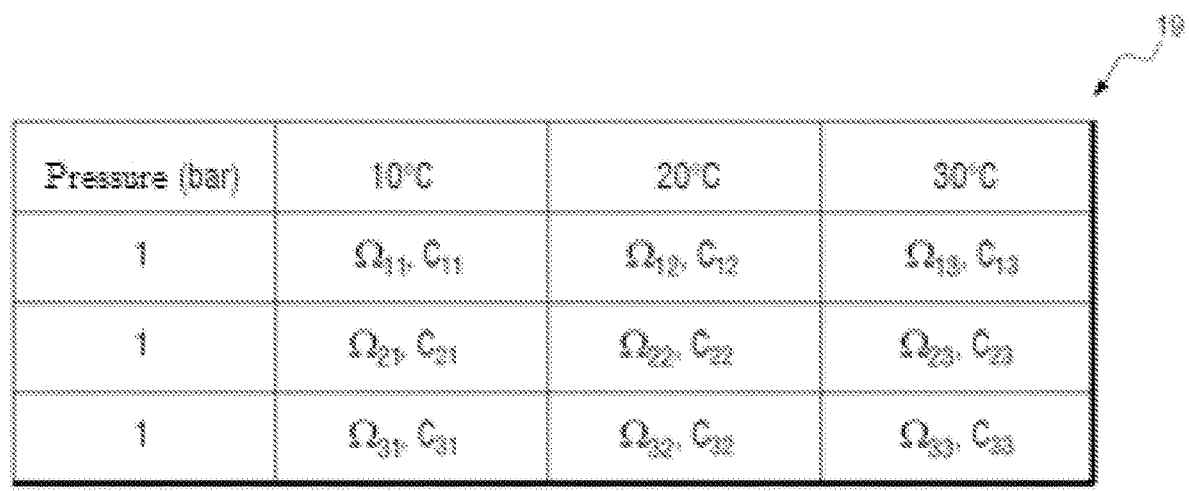
FIG. 13 shows a table for a fifth reference table.

Referring now to FIG. 13, the processing circuit 5 could use a fifth reference table 19 (instead of or in addition to the fourth reference table). The fifth reference table 19 comprises a first table making it possible to link the temperature and the first pressure P1 via a pair [first electrical impedance Z1 (at the excitation frequency), speed of sound in water, c] and a second table making it possible to link the temperature and the second pressure P2 via a pair [second electrical impedance Z2 (at the excitation frequency), speed of sound in water, c].

As an example, still with reference to FIG. 13 which shows only the first table, if the temperature is equal to 10° C., the first impedance Z1 at the excitation frequency is equal to $\Omega_{21}$ and the speed of sound in water is equal to $C_{21}$, then the first pressure P1 is equal to 8 bar.

Figure 14:
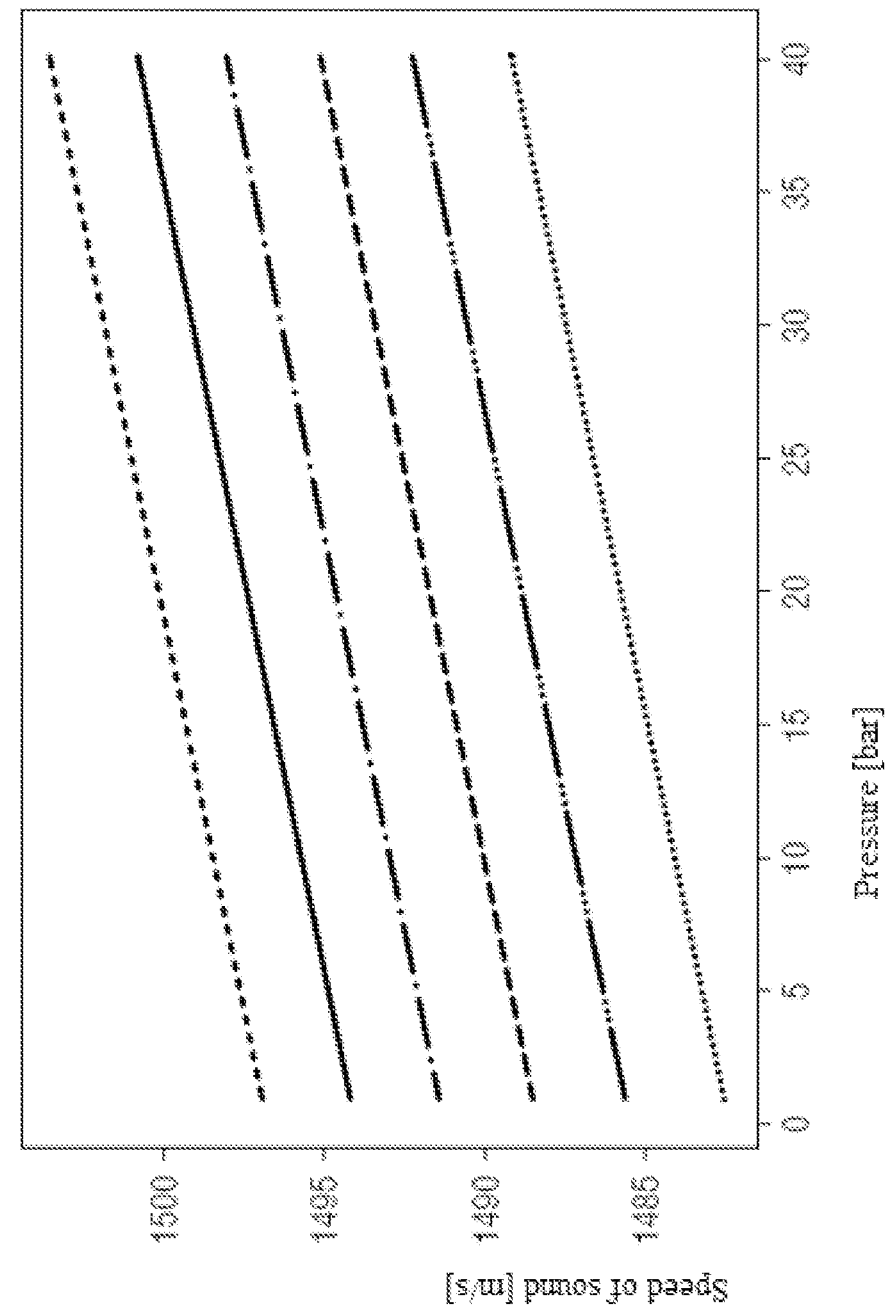
FIG. 14 shows a graph comprising plots for the speed of sound in water as a function of pressure at different values of temperature.
Figure 15:
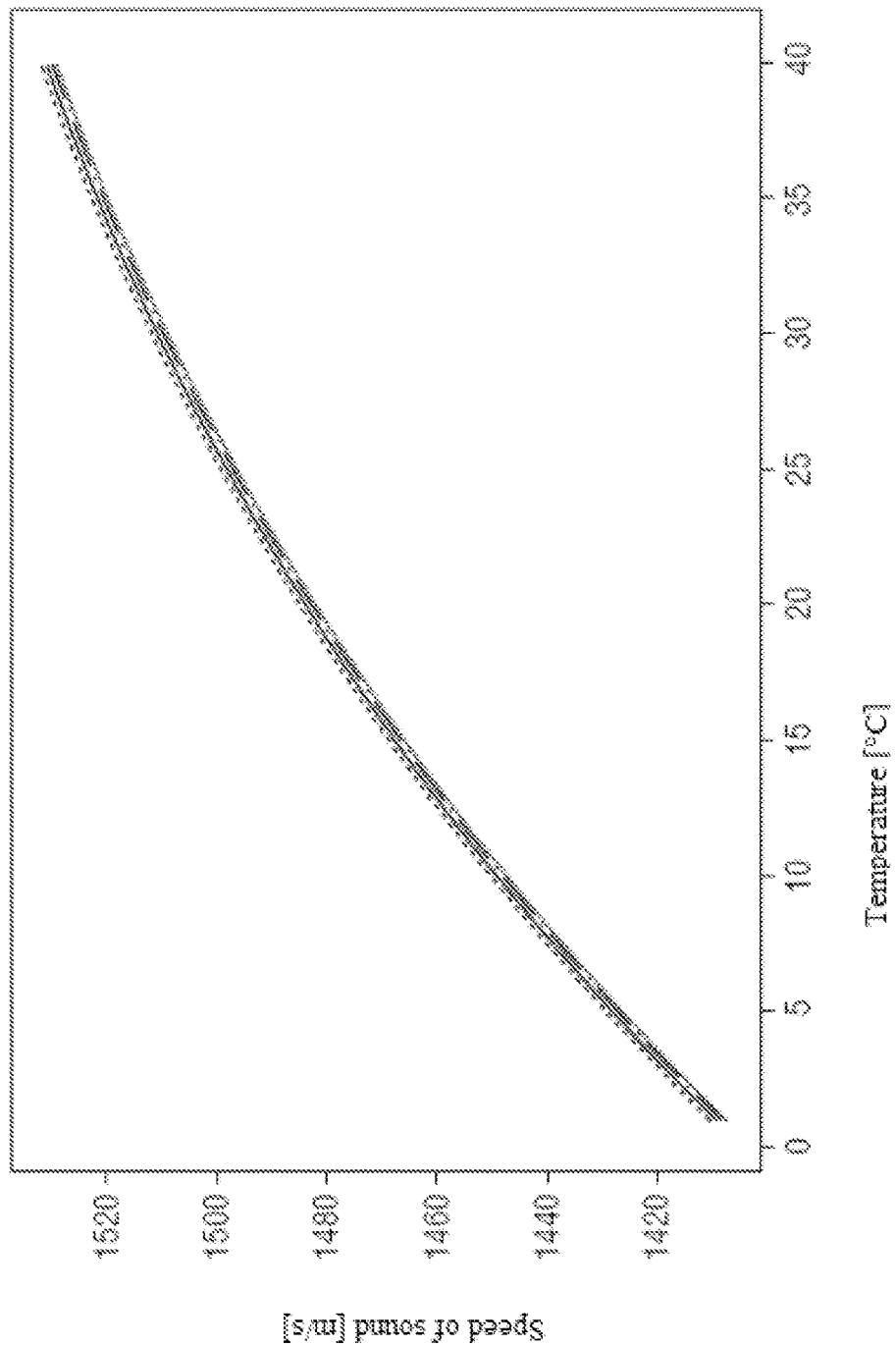
FIG. 15 shows a graph comprising plots for the variation in the speed of sound in water as a function of temperature at different values of pressure.
Figure 16:
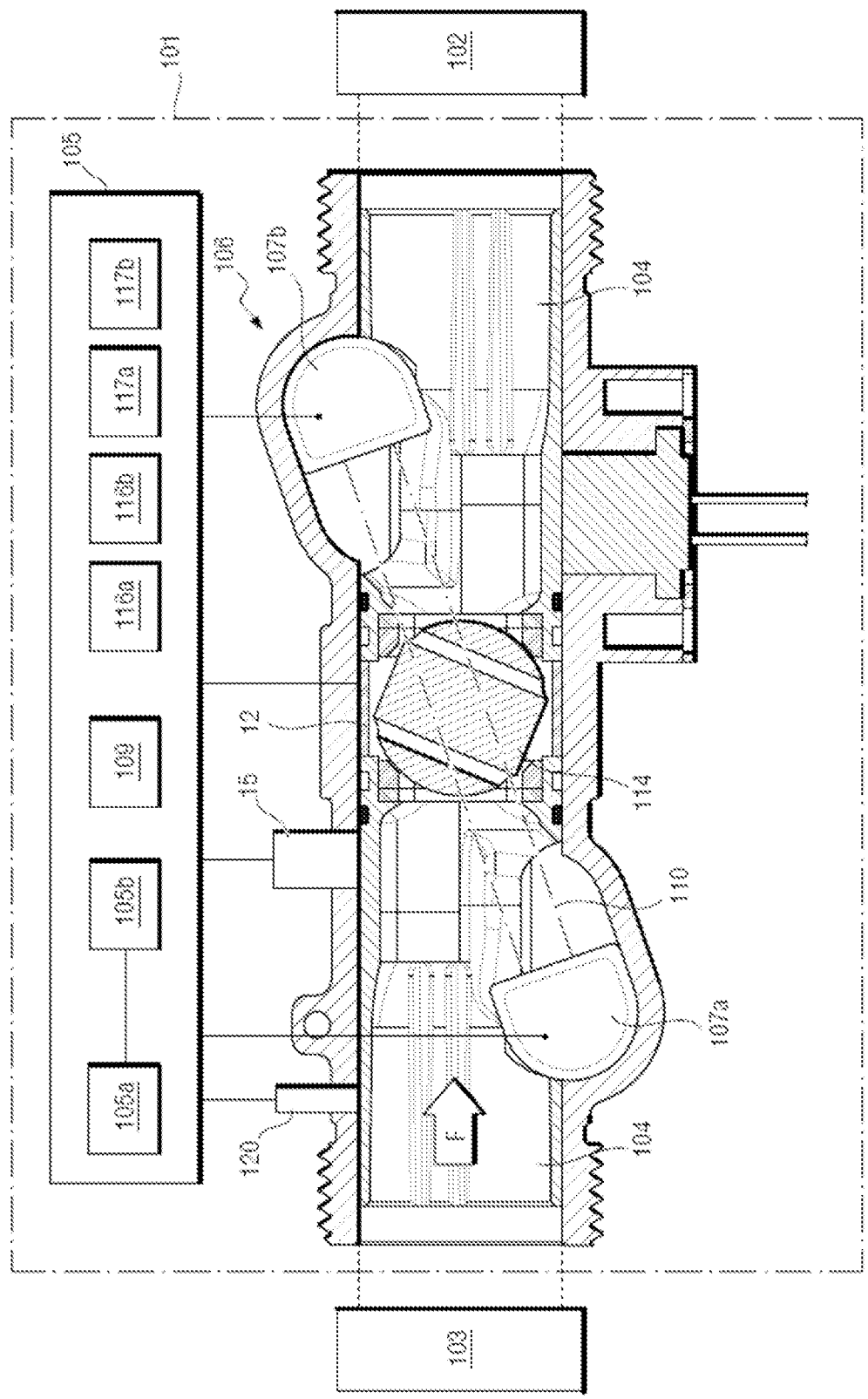
FIG. 16 shows an ultrasonic fluid meter in accordance with a second embodiment of the invention.
Figure 17:
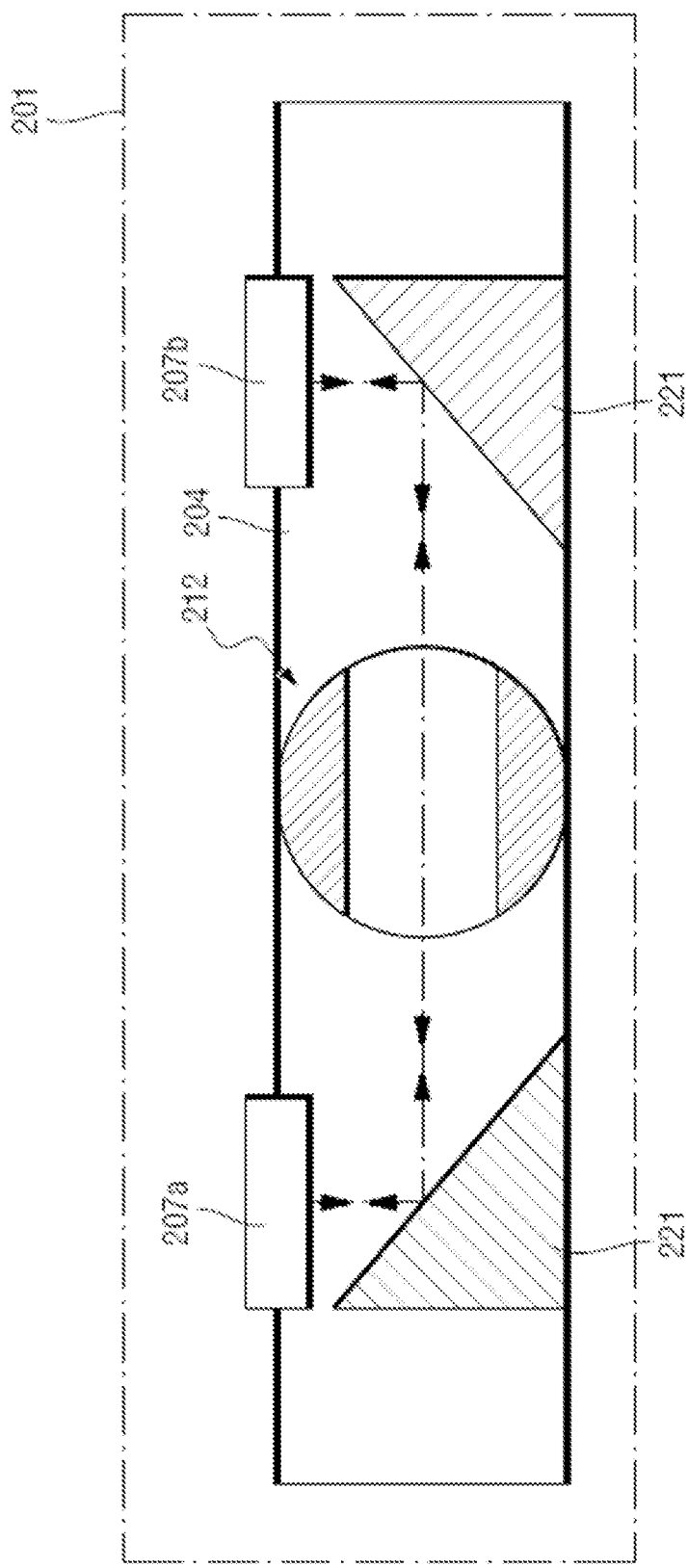
FIG. 17 shows an ultrasonic fluid meter in accordance with a third embodiment of the invention.

The use of the fifth reference table by the processing circuit 5 could make it possible to evaluate the first pressure P1 and the second pressure P2 as well as the temperature via an optimization process and increase the accuracy with which the current flow rate is measured. In fact, referring now to FIGS. 14 and 15, it can clearly be seen that the speed of sound in water, c, is a function of both the pressure and the temperature.

It should be noted that, in order to evaluate the first pressure P1 and the second pressure P2, the measured quantities are the first impedance Z1 of the upstream transducer 7a, the second impedance Z2 of the downstream transducer 7b and the speed of sound in the water, c. This later is measured here using the ultrasonic measuring device 6, for example.

It should be noted that the invention may clearly be carried out in a fluid meter other than a water meter. The fluid may in particular be a compressible fluid (for example a gas).

In this case, advantageously, with reference to FIG. 11, the ultrasonic fluid meter 101 in accordance with a second embodiment of the invention comprises a temperature sensor 120 for the fluid. Here, the temperature sensor 120 is located upstream of the upstream transducer 7a. It should be noted that the references of FIG. 11 are those of FIG. 1 increased by the value 100.

In the case of a compressible fluid, it is in fact impossible to correlate the load drop with the flow rate without knowing the temperature.

Specifically, it is known that:

$$P \cdot V = n \cdot R \cdot T,$$

with:
P: pressure (Pa);
V: volume (m3);
n: quantity of material (mol);
R: ideal gas constant ($\approx$8,314 J/K/mol);
T: absolute temperature (K).

At a given temperature, we have:

$$Q = K \times \sqrt{\Delta P},$$

with:
$\Delta P$: pressure drop;
Q: flow rate, in litres per hour.

According to Gay-Lussac's law, at constant volume, the pressure of a certain quantity of gas is directly proportional to its absolute temperature ($P \propto T$):

$$\frac{P1}{T1} = \frac{P2}{T2}$$

Consequently, a variation in pressure may be due to a variation in the flow rate or to a variation in temperature, whence the importance of knowing the absolute temperature in order to be able to correlate the flow rate with the pressure drop. It is therefore necessary to integrate a temperature sensor in the case of gases and to carry out the measurements at constant temperature (if there is only one temperature sensor).

The processing circuit 105 therefore uses a sixth reference table which is in four dimensions. By way of example, this sixth reference table corresponds to the third reference table 18 to which a fourth dimension corresponding to temperature is added. Naturally, the invention is not limited to the described embodiments, but covers any variant coming within the scope of the invention as defined by the claims.

Clearly, the invention is of application irrespective of the positioning and the configuration of the upstream transducer and the downstream transducer. The ultrasonic signals may be emitted with an orientation at an angle that is arbitrary relative to a longitudinal axis of the duct.

The predefined path between the transducers does not necessarily need to be a straight path. FIG. 12 shows an ultrasonic fluid meter 201 in accordance with a third embodiment. The ball valve 212 is in the open position. The ultrasonic signals in the conduit 204 emitted and received by the transducers 207a, 207b are reflected by reflectors 221, for example mirrors orientated at 45°.

Clearly, the invention does not apply solely to a water meter, but applies to any meter for any fluid: gas, petroleum, oil, medicine, etc.

The valve does not necessarily need to be a ball valve. Any type of valve may be used to regulate the flow rate, for example a slide valve. The position of the movable member, making it possible to regulate the flow rate, is not necessarily an angular position, but may be an axial position.

It is also possible for the meter in accordance with the invention to comprise a single voltage sensor and a single current sensor for the two transducers 7a, 7b.

APPENDIX

The table below contains the coefficients used in Belogol'skii et al's equation.

| | |
|---|---|
| $a_{00}$ | 1402.38744 |
| $a_{10}$ | 5.03836171 |
| $a_{20}$ | $-5.81172916 \times 10^{-2}$ |
| $a_{30}$ | $3.34638117 \times 10^{-4}$ |
| $a_{40}$ | $-1.48259672 \times 10^{-6}$ |
| $a_{50}$ | $3.16585020 \times 10^{-9}$ |
| $a_{01}$ | 1.49043589 |
| $a_{11}$ | $1.077850609 \times 10^{-2}$ |
| $a_{21}$ | $-2.232794656 \times 10^{-4}$ |
| $a_{31}$ | $2.718246452 \times 10^{-6}$ |
| $a_{02}$ | $4.31532833 \times 10^{-3}$ |
| $a_{12}$ | $-2.938590293 \times 10^{-4}$ |
| $a_{22}$ | $6.822485943 \times 10^{-6}$ |
| $a_{32}$ | $-6.674551162 \times 10^{-8}$ |
| $a_{03}$ | $-1.852993525 \times 10^{-5}$ |
| $a_{13}$ | $1.481844713 \times 10^{-6}$ |
| $a_{23}$ | $-3.940994021 \times 10^{-8}$ |
| $a_{33}$ | $3.939902307 \times 10^{-10}$ |

The invention claimed is:

1. An ultrasonic fluid meter comprising:
a conduit in which a fluid can flow;
an ultrasonic measuring device comprising an upstream transducer and a downstream transducer which are piezoelectric transducers and which are configured to emit and receive ultrasonic signals in the conduit, the ultrasonic measuring device being configured to evaluate a current flow rate of the fluid from times of flight of the ultrasonic signals between the upstream transducer and the downstream transducer;
a valve positioned along a length of the conduit between the upstream transducer and the downstream transducer, the valve comprising a movable member which extends in the conduit and for which a current position can be regulated in order to control the current flow rate of the fluid;
a position sensor configured to measure the current position of the movable member;
a processing circuit which, if the current position of the movable member is such that the current flow rate cannot be measured by the ultrasonic measuring device, is configured to evaluate the current flow rate as a function of the current position of the movable member and of a pressure value which is representative of a difference between a second pressure of the fluid in the conduit downstream of the valve and a first pressure of the fluid in the conduit upstream of the valve, the first pressure being evaluated from a first electrical impedance of the upstream transducer and the second pressure being evaluated from a second electrical impedance of the downstream transducer.

2. The ultrasonic fluid meter according to claim 1, wherein the first electrical impedance is an electrical impedance of the upstream transducer at an excitation frequency of the upstream transducer, and the second electrical impedance is an electrical impedance of the downstream transducer at said excitation frequency.

3. The ultrasonic fluid meter according to claim 1, wherein the processing circuit is configured to:
excite the upstream transducer at frequencies included in a first predetermined frequency range in order to evaluate a first function for the first impedance as a function of frequency over said first range;
excite the downstream transducer at frequencies included in a second predetermined frequency range in order to evaluate a second function for the second impedance as a function of frequency over said second range;
from the first function, evaluate a first offset with respect to a first reference frequency of a first resonance frequency or of a first antiresonance frequency of the upstream transducer;
from the second function, evaluate a second offset with respect to a second reference frequency of a second resonance frequency or of a second antiresonance frequency of the downstream transducer;
evaluate the first pressure from the first offset and the second pressure from the second offset.

4. The ultrasonic fluid meter according to claim 1, the processing circuit being configured, if the current position of the movable member is such that the current flow rate can be measured by the ultrasonic measuring device, to:
evaluate a pressure of the fluid at zero flow rate;
estimate the temperature of the fluid by using the pressure of the fluid at zero flow rate;
produce a first flow rate value from the time of flight of the ultrasonic signals between the first transducer and the second transducer and from the temperature of the fluid.

5. The ultrasonic fluid meter according to claim 4, the processing circuit furthermore being configured to:
produce a second flow rate value from the current position of the movable member and from the pressure value;
produce a consolidated flow rate value from the first flow rate value and from the second flow rate value.

6. The ultrasonic fluid meter according to claim 4, wherein, in order to evaluate the pressure of the fluid at zero flow rate, the processing circuit is configured to:
wait until the current flow rate becomes zero;
then evaluate the first pressure from the first impedance or the second pressure from the second impedance.

7. The ultrasonic fluid meter according to claim 1, the fluid being a compressible fluid, the fluid meter further comprising a temperature sensor configured to measure a temperature of the fluid in the conduit, the processing circuit being configured such that, if the current position of the movable member is such that the current flow rate cannot be measured by the ultrasonic measuring device, it also uses the temperature of the fluid to evaluate the current flow.

8. The ultrasonic fluid meter according to claim 1, wherein the valve is a ball valve.

9. A method for measuring a current flow rate of a fluid, carried out in the processing circuit of an ultrasonic fluid meter according to claim 1 and, if the current position of the movable member is such that the current flow rate cannot be measured by the ultrasonic measuring device, comprising the step of evaluating the current flow rate as a function of the current position of the movable member and of the pressure value which is representative of the difference between the second pressure and the first pressure.

10. The measurement method according to claim 9, wherein the first electrical impedance is an electrical impedance of the upstream transducer at an excitation frequency of the upstream transducer, and the second electrical impedance is an electrical impedance of the downstream transducer at said excitation frequency.

11. The measurement method according to claim 9, comprising the steps of:
exciting the upstream transducer at frequencies included in a first predetermined frequency range and evaluating a first function of the first impedance as a function of frequency over said first range;
exciting the downstream transducer at frequencies included in a second predetermined frequency range and evaluating a second function of the second impedance as a function of frequency over said second range;
from the first function, evaluate a first offset with respect to a first reference frequency of a first resonance frequency or of a first antiresonance frequency of the upstream transducer;
from the second function, evaluate a second offset with respect to a second reference frequency of a second resonance frequency or of a second antiresonance frequency of the downstream transducer;
evaluate the first pressure from the first offset and the second pressure from the second offset.

12. The measurement method according to claim 9, wherein, if the current position of the movable member is such that the current flow rate can be measured by the ultrasonic measuring device, it comprises the steps of
using the ultrasonic measuring device to measure the current flow rate;
waiting until the current flow rate becomes zero;
then evaluating the first pressure from the first impedance or the second pressure from the second impedance, and thus evaluating the pressure of the fluid at zero flow rate;
estimate the temperature of the fluid by using the pressure of the fluid at zero flow rate;
estimating a first flow rate value from the time of flight of the ultrasonic signals between the first transducer and the second transducer and from the temperature of the fluid.

13. The measurement method according to claim 12, further comprising the steps of:
producing a second flow rate value from the current position of the movable member and from the pressure value;
producing a consolidated flow rate value from the first flow rate value and from the second flow rate value.

14. The measurement method according to claim 9, further comprising the steps of:
defining a time interval between a time t1 and a time t2, such that at time t1, a difference between the second pressure and the first pressure changes from a zero value to a value which is higher than a predefined threshold, and at time t2, the difference between the second pressure and the first pressure changes from a second value which is higher than the predefined threshold to the zero value,
integrating the current flow over the time interval and thus evaluating a volume of fluid distributed via the conduit.

15. A non-transitory storage media which can be read by a computer, on which a computer program comprising instructions which cause the processing circuit of the meter to execute the steps of the measurement method as claimed in claim 9 is stored.

16. A method for regulating a current flow rate, which is carried out in a processing circuit of an ultrasonic fluid meter according to claim 1 and comprising the steps of:
- acquiring a flow rate setpoint;
- estimating the current flow rate using a measurement method for measuring a current flow rate of a fluid, if the current position of the movable member is such that the current flow rate cannot be measured by the ultrasonic measuring device, comprising the step of evaluating the current flow rate as a function of the current position of the movable member and of the pressure value which is representative of the difference between the second pressure and the first pressure;
- adapting the current position of the movable member as a function of a difference between the flow rate setpoint and the current flow rate.

17. A non-transitory storage media which can be read by a computer, on which a computer program comprising instructions which cause a processing circuit of a meter to execute the steps of the regulation method according to claim 16 is stored.

\* \* \* \* \*